United States Patent
Akiba et al.

(10) Patent No.: US 11,875,944 B2
(45) Date of Patent: Jan. 16, 2024

(54) FILM CAPACITOR AND FILM FOR FILM CAPACITOR

(71) Applicant: Murata Manufacturing Co., Ltd., Nagaokakyo (JP)

(72) Inventors: Shiyunsuke Akiba, Nagaokakyo (JP); Tomoki Inakura, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 196 days.

(21) Appl. No.: 17/567,612

(22) Filed: Jan. 3, 2022

(65) Prior Publication Data
US 2022/0122774 A1 Apr. 21, 2022

Related U.S. Application Data

(63) Continuation of application No. PCT/JP2020/007344, filed on Feb. 25, 2020.

(30) Foreign Application Priority Data

Jul. 9, 2019 (JP) .................. 2019-127941

(51) Int. Cl.
| | |
|---|---|
| H01G 4/14 | (2006.01) |
| H01G 4/33 | (2006.01) |
| B32B 7/05 | (2019.01) |
| C08G 18/48 | (2006.01) |
| B32B 15/095 | (2006.01) |
| B32B 15/20 | (2006.01) |

(Continued)

(52) U.S. Cl.
CPC ............. *H01G 4/14* (2013.01); *B32B 7/05* (2019.01); *B32B 15/095* (2013.01); *B32B 15/20* (2013.01); *C08G 18/4895* (2013.01); *C08G 18/7621* (2013.01); *C08G 18/7671* (2013.01); *C08J 5/18* (2013.01); *H01G 4/32* (2013.01); *H01G 4/33* (2013.01); *B32B 2307/308* (2013.01); *B32B 2307/72* (2013.01); *B32B 2307/732* (2013.01); *B32B 2457/16* (2013.01); *C08J 2375/08* (2013.01)

(58) Field of Classification Search
None
See application file for complete search history.

(56) References Cited

U.S. PATENT DOCUMENTS

| | | | | |
|---|---|---|---|---|
| 9,416,216 B2 * | 8/2016 | Hioki | ................ | C08G 18/6212 |
| 2011/0310527 A1 * | 12/2011 | Hioki | ...................... | H01G 4/18 |
| | | | | 525/123 |

(Continued)

FOREIGN PATENT DOCUMENTS

| | | |
|---|---|---|
| JP | S60180008 A | 9/1985 |
| JP | H10149944 A | 6/1998 |

(Continued)

OTHER PUBLICATIONS

International Search Report issued for PCT/JP2020/007344, dated Mar. 24, 2020.

*Primary Examiner* — Dion R. Ferguson
(74) *Attorney, Agent, or Firm* — ArentFox Schiff LLP

(57) ABSTRACT

A film capacitor that includes a dielectric resin film having a glass transition temperature of 160° C. or higher and a density at 25° C. of 1.22 g/cm³ to 1.26 g/cm³; and a metal layer on at least one surface of the dielectric resin film.

16 Claims, 1 Drawing Sheet

(51) Int. Cl.
*C08G 18/76* (2006.01)
*C08J 5/18* (2006.01)
*H01G 4/32* (2006.01)

(56) References Cited

U.S. PATENT DOCUMENTS

| | | | |
|---|---|---|---|
| 2020/0211772 A1* | 7/2020 | Ichikawa | B32B 15/095 |
| 2020/0211778 A1* | 7/2020 | Ichikawa | H01G 4/32 |
| 2020/0273624 A1 | 8/2020 | Jogan et al. | |
| 2022/0122774 A1* | 4/2022 | Akiba | B32B 15/092 |
| 2023/0193024 A1* | 6/2023 | Tsuda | H05K 1/03 |
| | | | 428/195.1 |
| 2023/0245825 A1* | 8/2023 | Yamazaki | H01G 4/012 |
| | | | 361/301.5 |

FOREIGN PATENT DOCUMENTS

| | | | | |
|---|---|---|---|---|
| JP | H10315418 A | | 12/1998 | |
| JP | 2021009924 A | * | 1/2021 | |
| WO | WO-2010101170 A1 | * | 9/2010 | C08G 18/6212 |
| WO | 2019097753 A1 | | 5/2019 | |
| WO | WO-2019097751 A1 | * | 5/2019 | B32B 15/08 |
| WO | WO-2019097753 A1 | * | 5/2019 | H01G 4/008 |

* cited by examiner

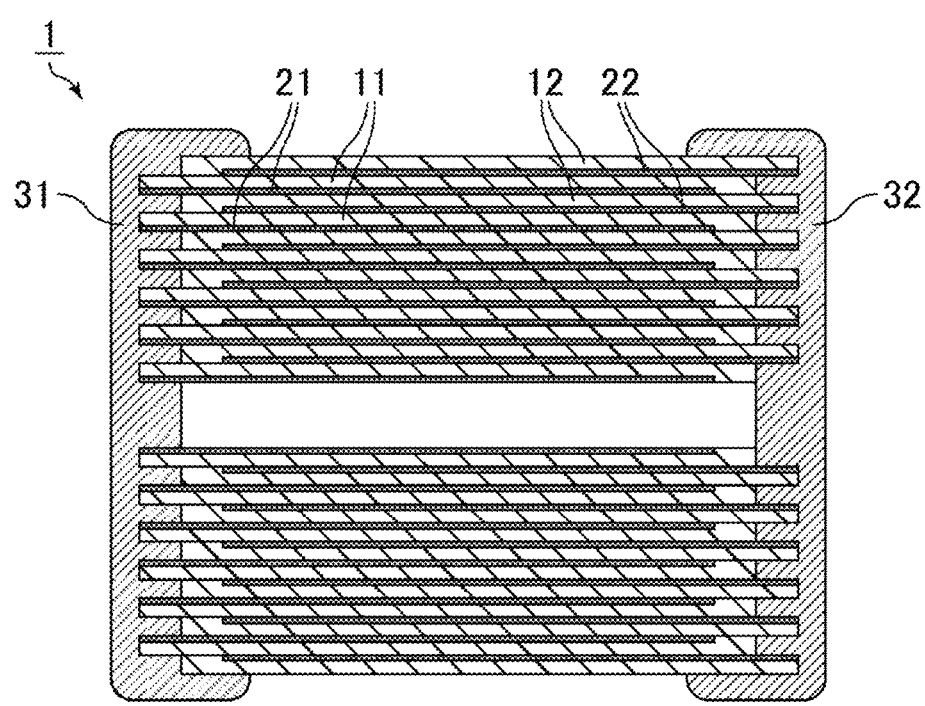

FILM CAPACITOR AND FILM FOR FILM CAPACITOR

CROSS REFERENCE TO RELATED APPLICATIONS

The present application is a continuation of International application No. PCT/JP2020/007344, filed Feb. 25, 2020, which claims priority to Japanese Patent Application No. 2019-127941, filed Jul. 9, 2019, the entire contents of each of which are incorporated herein by reference.

FIELD OF THE INVENTION

The present invention relates to a film capacitor and a film for a film capacitor.

BACKGROUND OF THE INVENTION

A film capacitor has a general structure in which a first counter electrode and a second counter electrode face each other with a flexible resin film serving as a dielectric is interposed therebetween. The film capacitor usually has a substantially cylindrical shape formed by winding the resin film serving as the dielectric, and a first external terminal electrode and a second external terminal electrode are formed on a first end surface and a second end surface of the cylinder facing each other, respectively. The first counter electrode is electrically connected to the first external terminal electrode, and the second counter electrode is electrically connected to the second external terminal electrode.

Patent Document 1 discloses a capacitor including a dielectric made of a polymer film and a conductor made of a metal foil or a metal thin film, in which the polymer film is made of polyester containing 50 mol % or more of a specific repeating unit and has a refractive index in a thickness direction of 1.50 to 1.57, a density of 1.45 to 1.50 g/cm$^3$, and an extracted low molecular weight component content of 1.0 wt % or less.

Patent Document 1: Japanese Patent Application Laid-Open No. S60-180008

SUMMARY OF THE INVENTION

Patent Document 1 discloses that the density of the polyester film constituting the dielectric needs to be in the range of 1.45 to 1.50 g/cm$^3$, preferably 1.46 to 1.48 g/cm$^3$. According to Patent Document 1, when the density of the film is smaller than the above range, the variation in the breakdown voltage of the capacitor increases, and conversely, when the density is larger than the above range, the breakdown voltage of the capacitor decreases, and the variation also increases, which is not preferable.

However, in the film capacitor disclosed in Patent Document 1, the breakdown voltage of the capacitor is evaluated under the condition of 25° C., and the withstand voltage is significantly reduced under the condition of a higher temperature. Since a film capacitor is assumed to be used in a severe environment such as an in-vehicle environment, it is necessary to have high reliability under a high-temperature condition.

The present invention has been made to solve the above problems, and an object of the present invention is to provide a film capacitor including a dielectric resin film having sufficient dielectric breakdown strength in a high-temperature environment. Another object of the present invention is to provide a film for a film capacitor used as the dielectric resin film of the film capacitor.

A film capacitor of the present invention is a film capacitor including a dielectric resin film having a glass transition temperature of 160° C. or higher and a density at 25° C. of 1.22 g/cm$^3$ to 1.26 g/cm$^3$; and a metal layer on at least one surface of the dielectric resin film.

The dielectric resin film for a film capacitor of the present invention has a glass transition temperature of 160° C. or higher and a density at 25° C. of 1.22 g/cm$^3$ to 1.26 g/cm$^3$.

According to the present invention, it is possible to provide a film capacitor including a dielectric resin film having sufficient dielectric breakdown strength under a high-temperature environment.

BRIEF EXPLANATION OF THE DRAWING

The FIGURE is a schematic sectional view of an example of a film capacitor of the present invention.

DETAILED DESCRIPTION OF THE INVENTION

A film capacitor and a film for a film capacitor of the present invention are described below.

However, the present invention is not limited to the following configuration and can be appropriately modified and applied without changing the gist of the present invention.

A combination of two or more individual desirable configurations of the present invention described below are also the present invention.

[Film Capacitor]

The film capacitor of the present invention includes a dielectric resin film and a metal layer provided on one surface of the dielectric resin film.

As an embodiment of the film capacitor of the present invention, a wound film capacitor obtained by winding a first dielectric resin film provided with a first metal layer and a second dielectric resin film provided with a second metal layer in a laminated state will be described below as an example.

The film capacitor of the present invention may be a laminated film capacitor obtained by laminating a first dielectric resin film provided with a first metal layer and a second dielectric resin film provided with a second metal layer.

The FIGURE is a schematic sectional view of an example of the film capacitor of the present invention.

A film capacitor 1 shown in the FIGURE is a wound film capacitor and includes a first dielectric resin film 11 and a second dielectric resin film 12 in a wound state and a first metal layer (first counter electrode) 21 and a second metal layer (second counter electrode) 22 facing each other with the first dielectric resin film 11 or the second dielectric resin film 12 interposed therebetween as well as a first external terminal electrode 31 electrically connected to the first metal layer 21 and a second external terminal electrode 32 electrically connected to the second metal layer 22.

The first metal layer 21 is formed on the first dielectric resin film 11, and the second metal layer 22 is formed on the second dielectric resin film 12. The first dielectric resin film 11 on which the first metal layer 21 has been formed and the second dielectric resin film 12 on which the second metal layer 22 has been formed are wound in a laminated state to constitute the film capacitor 1. The second dielectric resin film 12 may have a configuration different from the configuration of the first dielectric resin film 11 but preferably has the same configuration as the configuration of the first dielectric resin film 11.

The first metal layer 21 is formed so as to reach one side edge but not to reach the other side edge on one surface of the first dielectric resin film 11. On the other hand, the second metal layer 22 is formed so as not to reach one side edge but to reach the other side edge on one surface of the second dielectric resin film 12. The first metal layer 21 and the second metal layer 22 are made of, for example, aluminum layers.

As shown in the FIGURE, the first dielectric resin film 11 and the second dielectric resin film 12 are laminated so as to be shifted from each other in the width direction such that both the end of the first metal layer 21 on the side reaching the side edge of the first dielectric resin film 11 and the end of the second metal layer 22 on the side reaching the side edge of the second dielectric resin film 12 are exposed from the laminated films. The first dielectric resin film 11 and the second dielectric resin film 12 are wound in a laminated state, so that the first metal layer 21 and the second metal layer 22 are laminated such that the ends thereof are exposed.

In the film capacitor 1 shown in the FIGURE, winding is performed such that the second dielectric resin film 12 is located outside the first dielectric resin film 11 and such that, for each of the first dielectric resin film 11 and the second dielectric resin film 12, the first metal layer 21 and the second metal layer 22 face inward.

The first external terminal electrode 31 and the second external terminal electrode 32 are formed by, for example, thermal-spraying zinc or the like on each end surface of a capacitor main body obtained as described above. The first external terminal electrode 31 is in contact with the exposed end of the first metal layer 21, thereby being electrically connected to the first metal layer 21. On the other hand, the second external terminal electrode 32 is in contact with the exposed end of the second metal layer 22, thereby being electrically connected to the second metal layer 22.

In the film capacitor of the present invention, it is preferable that the wound body of the dielectric resin films be pressed to have a flat sectional shape such as an ellipse or an oval and have a more compact shape than when the sectional shape is a perfect circle. The film capacitor of the present invention may include a cylindrical winding shaft. The winding shaft is disposed on the central axis of the wound dielectric resin films and serves as a winding shaft when the dielectric resin films are wound.

In the film capacitor of the present invention, examples of the metal contained in the metal layers include aluminum (Al), titanium (Ti), zinc (Zn), magnesium (Mg), tin (Sn), and nickel (Ni).

In the film capacitor of the present invention, the thickness of the metal layers is not particularly limited but is, for example, 5 nm to 40 nm.

The thickness of each metal layer can be specified by inspecting a section obtained by cutting the dielectric resin film provided with the metal layer in the thickness direction using an electron microscope such as a field emission scanning electron microscope (FE-SEM).

In the film capacitor of the present invention, a film for a film capacitor of the present invention is used as the dielectric resin film.

[Film for Film Capacitor]

The film for a film capacitor of the present invention has a glass transition temperature of 160° C. or higher and a density at 25° C. of 1.22 g/cm$^3$ to 1.26 g/cm$^3$.

By setting the glass transition temperature of the film to 160° C. or higher and setting the density of the film at 25° C. to 1.22 g/cm$^3$ to 1.26 g/cm$^3$, the dielectric breakdown strength of the film at 125° C. can be increased. Therefore, a film excellent in withstand voltage under a high-temperature environment can be obtained.

It is considered that the dielectric breakdown of the film is likely to occur in a cavity in the film. It is considered that by increasing the density of the film, the film is densified and the number of cavities in the film is reduced, so that the dielectric breakdown strength is increased and the withstand voltage is improved. When the density of the film is low, the distance between molecules constituting the film increases, so that the crosslinking density after thermal curing is not increased, and the withstand voltage is considered to be lowered. On the other hand, when the density of the film is too high, the film is not stably formed, so that the dielectric breakdown strength is rather lowered, and the withstand voltage is lowered. In addition, it is considered that the toughness of the film that becomes lower as the density of the film increases also affects the decrease in the withstand voltage.

The density of the film is determined by dividing the weight of the film by the volume. The volume of the film is calculated from the area and average thickness of the film.

The glass transition temperature of the film is determined from the temperature at which the storage elastic modulus starts to decrease significantly by measuring the storage elastic modulus using a dynamic viscoelasticity measuring device (DMA).

In the film for a film capacitor of the present invention, the upper limit of the glass transition temperature is not particularly limited, but the glass transition temperature is, for example, 250° C. or lower.

The film for a film capacitor of the present invention preferably contains a curable resin as a main component. The curable resin may be a thermosetting resin or a photocurable resin.

In the present specification, the "main component" means a component having the largest weight percentage and preferably means a component having a weight percentage of more than 50 wt %. Therefore, the film for a film capacitor of the present invention may contain, for example, an additive such as a silicone resin or an uncured portion of a starting material such as a first organic material and a second organic material described later as a component other than the main component.

In the present specification, the thermosetting resin means a resin that can be cured by heat and does not limit a curing method. Therefore, as long as the resin can be cured by heat, a resin cured by a method other than heat (such as light and an electron beam) is also included in the thermosetting resin. In addition, depending on the material, the reaction may start due to the reactivity of the material itself, and a material in which curing proceeds without necessarily applying heat, light, or the like from the outside is also referred to as a thermosetting resin. The same applies to the photocurable resin, and the curing method is not limited.

The curable resin may or may not contain at least one of a urethane bond and a urea bond.

The presence of a urethane bond and/or a urea bond can be confirmed by Fourier-transform infrared spectroscopy (FT-IR).

The film for a film capacitor of the present invention is preferably formed of a cured product of the first organic material and the second organic material. Examples thereof include a cured product obtained by a reaction of a hydroxy group (OH group) of the first organic material with an isocyanate group (NCO group) of the second organic material.

When a cured product is obtained by the above reaction, an uncured portion of the starting materials may remain in the film. For example, the film for a film capacitor of the present invention may contain at least one of a hydroxy group and an isocyanate group. In this case, the film for a film capacitor of the present invention may contain either one of a hydroxy group and an isocyanate group or may contain both a hydroxy group and an isocyanate group.

The presence of an isocyanate group and/or a hydroxy group can be confirmed by Fourier-transform infrared spectroscopy (FT-IR).

The first organic material is preferably a polyol containing a plurality of hydroxy groups in the molecule. Examples of the polyol include a polyether polyol, a polyester polyol, and polyvinyl acetoacetal. As the first organic material, two or more kinds of organic materials may be used in combination.

The first organic material preferably contains an epoxy group. In particular, the first organic material is preferably a phenoxy resin, more preferably a high-molecular-weight bisphenol A-type epoxy resin containing an epoxy group at the terminal.

The second organic material is preferably a polyisocyanate containing a plurality of isocyanate groups in the molecule. The second organic material reacts with a hydroxy group of the first organic material to form a crosslinked structure, thereby functioning as a curing agent for curing the film.

Examples of the polyisocyanate include aromatic polyisocyanates such as diphenylmethane diisocyanate (MDI) and tolylene diisocyanate (TDI) and aliphatic polyisocyanates such as hexamethylene diisocyanate (HDI). A modified product of these polyisocyanates, such as a modified product containing carbodiimide or urethane, may be used. Among these substances, aromatic polyisocyanates are preferable, MDI or TDI is more preferable, and MDI is still more preferable. As MDI, typical polymeric MDI or monomeric MDI can be used. The MDI may be a mixture type. As TDI, a trimethylolpropane (TMP) adduct can be used. As the TDI, a biuret-modified product may be used. As the second organic material, two or more kinds of organic materials may be used in combination.

In the film for a film capacitor of the present invention, the weight ratio of the first organic material to the second organic material (first organic material/second organic material) is not particularly limited but is preferably 10/90 or more, more preferably 20/80 or more, still more preferably 30/70 or more, and is preferably 90/10 or less, more preferably 80/20 or less, still more preferably 70/30 or less. In particular, the weight ratio of the first organic material to the second organic material (first organic material/second organic material) preferably exceeds 50/50.

The film for a film capacitor of the present invention can also contain an additive for imparting another function. For example, smoothness can be imparted by adding a leveling agent. The additive is more preferably a material containing a functional group that reacts with a hydroxy group and/or an isocyanate group and constituting a part of the crosslinked structure of the cured product. Examples of such a material include a resin having at least one functional group selected from the group consisting of a hydroxy group, an epoxy group, a silanol group, and a carboxy group.

The film for a film capacitor of the present invention is preferably obtained by forming a resin solution containing the first organic material and the second organic material into a film shape and then curing the resin solution by heat treatment.

The resin solution is prepared, for example, by dissolving and mixing the above-described first organic material and second organic material in a solvent and adding an additive as necessary. In the cured film, the solvent contained in the resin solution may be present as a residue.

The solvent contained in the resin solution becomes a gas by heating such as heat treatment and forms a cavity in the film. Therefore, when the amount of the solvent in the resin solution is too large, a large amount of volatile gas is generated to form a large number of cavities, so that the density of the film tends to decrease. Therefore, when the ratio of the total weight of the first organic material and the second organic material in the resin solution is taken as the resin concentration, the resin concentration in the resin solution is preferably 5 wt % to 50 wt %.

As the solvent, a mixed solvent containing a first solvent selected from ketones and a second solvent selected from cyclic ether compounds is preferably used. Examples of the ketones include methyl ethyl ketone and diethyl ketone. Examples of the cyclic ether compounds include tetrahydrofuran and tetrahydropyran. The weight ratio of the first solvent to the second solvent (first solvent/second solvent) is preferably 15/85 to 85/15.

The thickness of the film for a film capacitor of the present invention is not particularly limited, but the film tends to be brittle when the film is too thin, whereas defects such as cracks tend to occur during film formation when the film is too thick. Therefore, the thickness of the film for a film capacitor of the present invention is preferably 1 μm to 10 μm.

The thickness of the film means the thickness of the film alone, which does not include the thickness of the metal layer. The thickness of the film can be measured using an optical interference film thickness meter.

A metal layer may be provided on one surface of the film for a film capacitor of the present invention. In this case, a metal layer including a fuse portion is preferably provided on one surface.

The fuse portion means a portion connecting an electrode portion and another electrode portion obtained by dividing the metal layer serving as the counter electrode into a plurality of portions. The pattern of the metal layer having the fuse portion is not particularly limited, and for example, electrode patterns disclosed in Japanese Patent Application Laid-Open No. 2004-363431, Japanese Patent Application Laid-Open No. H5-251266, and the like can be used.

EXAMPLES

Examples in which the film for a film capacitor of the present invention is more specifically disclosed will be described below. Note that the present invention is not limited only to these examples.

[Production of Film]

(Films 1 to 5)

A phenoxy resin was provided as the first organic material, and MDI (4,4'-diphenylmethane diisocyanate) was provided as the second organic material.

As the phenoxy resin, a phenoxy resin that was a high-molecular-weight bisphenol A-type epoxy resin containing an epoxy group at the terminal was used.

As the MDI, Millionate MTL (manufactured by Tosoh Corporation) was used.

The first organic material and the second organic material dissolved in methyl ethyl ketone (MEK) were mixed, and the mixture was diluted with a mixed solvent containing MEK and tetrahydrofuran (THF). The weight ratio of the first organic material to the second organic material in the resulting resin solution was first organic material/second organic material=66.5/33.5. The weight ratio of MEK to THF was MEK/THF=50/50.

In the present examples, preparation was performed such that the total weight (resin concentration) of the phenoxy resin and MDI in the resin solution was 5 wt %, 10 wt %, 15 wt %, 25 wt %, or 50 wt % as shown in Table 1.

The resulting resin solution was formed on a PET film with a doctor blade coater, and the solvent was evaporated to provide an uncured film having a thickness of 3 μm. Next, this film was treated for 4 hours in a hot air oven set at 150° C. to be thermally cured and then peeled off from the PET film, so that a film was obtained.

(Films 6 to 10)

A phenoxy resin was provided as the first organic material, and a TDI (toluene diisocyanate) modified product was provided as the second organic material.

As the phenoxy resin, a phenoxy resin that was a high-molecular-weight bisphenol A-type epoxy resin containing an epoxy group at the terminal was used.

As the TDI, Coronate L (manufactured by Tosoh Corporation) was used.

The first organic material and the second organic material dissolved in MEK were mixed, and the mixture was diluted with a mixed solvent containing MEK and THF. The weight ratio of the first organic material to the second organic material in the resulting resin solution was first organic material/second organic material=66.5/33.5. The weight ratio of MEK to THF was MEK/THF=50/50.

In the present examples, preparation was performed such that the total weight (resin concentration) of the phenoxy resin and TDI in the resin solution was 5 wt %, 10 wt %, 15 wt %, 25 wt %, or 50 wt % as shown in Table 2.

The resulting resin solution was formed on a PET film with a doctor blade coater, and the solvent was evaporated to provide an uncured film having a thickness of 3 μm. Next, this film was treated for 4 hours in a hot air oven set at 150° C. to be thermally cured and then peeled off from the PET film, so that a film was obtained.

(Film 11)

A polypropylene (PP) film having a thickness of 2.8 μm was provided.

[Evaluation of Film]

The following properties of the films 1 to 11 were evaluated.

(Measurement of Dielectric Breakdown Strength)

An evaluation sample was provided in which aluminum vapor-deposited electrodes (electrode area of an overlapping portion was 30 cm$^2$) were formed on both surfaces of each film. A voltage was applied to the produced sample at 100 V/μm for 10 minutes, and then the voltage was raised at intervals of 25 V/μm. Each voltage was held for 10 minutes, and the electric field intensity when a fracture mark was formed on the film was recorded. The measurement was continued until fractures were observed at a total of 16 points. A Weibull plot was created on the basis of the recorded results, and the value at which the failure rate was 50% was taken as the dielectric breakdown strength. The ambient temperature of the film during the measurement was 125° C.

(Measurement of Density)

The weight of each film was determined, and the weight was divided by the volume to determine the density of the film.

For each film, 80 samples cut into 100 mm×50 mm were prepared, and the weights of the samples were measured. Next, the thickness of the film was measured using an optical interference film thickness meter (manufactured by Filmetrics Japan, Inc.), and the volume of the film was calculated from the obtained result and the area of the film. As the thickness of the film, the average of thicknesses measured at a total of 400 points was adopted. The density of the film was determined on the basis of the results obtained in the above measurement. The measurement temperature was 25° C.

(Measurement of Glass Transition Temperature)

Each film was fixed so as to have a width of 5 mm×a length of 6 mm, and the glass transition temperature of the film was measured using a dynamic viscoelasticity measuring device RSA3 (manufactured by TA Instruments Japan Inc.). The temperature was raised from 40° C. to 230° C. at a temperature raising rate of 20° C./min, and the temperature at which the storage elastic modulus started to greatly decrease was taken as the glass transition temperature.

Since the films 5 and 10 had too high crystallinity, the toughness was extremely low, and the glass transition temperature could not be measured.

TABLE 1

| Film No. | Resin concentration (wt %) | Film density (g/cm$^3$) | Glass transition temperature (° C.) | Dielectric breakdown strength (V/μm) |
|---|---|---|---|---|
| 1* | 5 | 1.21 | 152 | 330 |
| 2 | 10 | 1.23 | 160 | 390 |
| 3 | 15 | 1.24 | 171 | 410 |
| 4 | 25 | 1.26 | 184 | 430 |
| 5* | 50 | 1.37 | — | 280 |

TABLE 2

| Film No. | Resin concentration (wt %) | Film density (g/cm$^3$) | Glass transition temperature (° C.) | Dielectric breakdown strength (V/μm) |
|---|---|---|---|---|
| 6* | 5 | 1.20 | 167 | 330 |
| 7 | 10 | 1.22 | 173 | 400 |
| 8 | 15 | 1.24 | 182 | 420 |
| 9 | 25 | 1.26 | 196 | 440 |
| 10* | 50 | 1.41 | — | 290 |

TABLE 3

| Film No. | Film density (g/cm$^3$) | Glass transition temperature (° C.) | Dielectric breakdown strength (V/μm) |
|---|---|---|---|
| 11* | 0.86 | 0 | 270 |

In Tables 1 to 3, films marked with * are comparative examples outside the scope of the present invention.

Table 1 shows that the films obtained by thermally curing the mixture of the phenoxy resin and MDI had dielectric breakdown voltages of the films of 390 V/μm or more when the densities of the films were 1.23 g/cm$^3$ to 1.26 g/cm$^3$. In particular, when the density of the film was 1.26 g/cm$^3$, the dielectric breakdown strength of the film was 430 V/μm, which was the highest.

On the other hand, when the density of the film was 1.21 g/cm$^3$ or 1.37 g/cm$^3$, the dielectric breakdown strength of the film was significantly reduced. It can be said that sufficient dielectric breakdown strength cannot be maintained when the density of the film is too low or too high.

Table 2 shows that the films obtained by thermally curing the mixture of the phenoxy resin and TDI had dielectric breakdown voltages of the films of 400 V/μm or more when the densities of the films were 1.22 g/cm$^3$ to 1.26 g/cm$^3$. In particular, when the density of the film was 1.26 g/cm$^3$, the dielectric breakdown strength of the film was 440 V/μm, which was the highest.

On the other hand, when the density of the film was 1.20 g/cm$^3$ or 1.41 g/cm$^3$, the dielectric breakdown strength of the film was significantly reduced. It can be said that sufficient dielectric breakdown strength cannot be maintained when the density of the film is too low or too high.

Table 3 shows that the dielectric breakdown voltage of the PP film having a film density of 0.86 g/cm$^3$ was as low as 270 V/μm.

Each of the films 2 to 4 and 7 to 8 has a glass transition temperature of 160° C. or higher and exhibits high heat resistance. From the above, it can be said that, in order to exhibit excellent dielectric breakdown strength at a high temperature, it is necessary that the density of the film and the glass transition temperature are high.

DESCRIPTION OF REFERENCE SYMBOLS

1: Film capacitor
11: First dielectric resin film
12: Second dielectric resin film
21: First counter electrode (first metal layer)
22: Second counter electrode (second metal layer)
31: First external terminal electrode
32: Second external terminal electrode

The invention claimed is:

1. A film capacitor comprising:
    a dielectric resin film having a glass transition temperature of 160° C. or higher and a density at 25° C. of 1.22 g/cm$^3$ to 1.26 g/cm$^3$; and
    a metal layer on at least one surface of the dielectric resin film.

2. The film capacitor according to claim 1, wherein the dielectric resin film is a cured product of a first organic material and a second organic material.

3. The film capacitor according to claim 2, wherein
    the first organic material is a polyol containing a hydroxy group, and
    the second organic material is a polyisocyanate containing an isocyanate group.

4. The film capacitor according to claim 3, wherein the polyol is selected from at least one of a polyether polyol, a polyester polyol, and polyvinyl acetoacetal.

5. The film capacitor according to claim 4, wherein the polyisocyanate is selected from at least one of aromatic polyisocyanates and aliphatic polyisocyanates.

6. The film capacitor according to claim 3, wherein the polyisocyanate is selected from at least one of aromatic polyisocyanates and aliphatic polyisocyanates.

7. The film capacitor according to claim 1, wherein the glass transition temperature of the dielectric resin film is 160° C. to 250° C.

8. The film capacitor according to claim 1, wherein the dielectric resin film has a thickness of 1 μm to 10 μm.

9. A dielectric resin film for a film capacitor having a glass transition temperature of 160° C. or higher and a density at 25° C. of 1.22 g/cm$^3$ to 1.26 g/cm$^3$.

10. The dielectric resin film for a film capacitor according to claim 9, wherein the dielectric resin film is a cured product of a first organic material and a second organic material.

11. The dielectric resin film for a film capacitor according to claim 10, wherein
    the first organic material is a polyol containing a hydroxy group, and
    the second organic material is a polyisocyanate containing an isocyanate group.

12. The dielectric resin film for a film capacitor according to claim 11, wherein the polyol is selected from at least one of a polyether polyol, a polyester polyol, and polyvinyl acetoacetal.

13. The dielectric resin film for a film capacitor according to claim 12, wherein the polyisocyanate is selected from at least one of aromatic polyisocyanates and aliphatic polyisocyanates.

14. The dielectric resin film for a film capacitor according to claim 11, wherein the polyisocyanate is selected from at least one of aromatic polyisocyanates and aliphatic polyisocyanates.

15. The dielectric resin film for a film capacitor according to claim 9, wherein the glass transition temperature of the dielectric resin film is 160° C. to 250° C.

16. The dielectric resin film for a film capacitor according to claim 9, wherein the dielectric resin film has a thickness of 1 μm to 10 μm.

* * * * *